United States Patent [19]

Omata

[11] Patent Number: 5,011,581
[45] Date of Patent: Apr. 30, 1991

[54] PROCESS FOR PRODUCING A THIN ALLOY FILM HAVING HIGH SATURATION MAGNETIC FLUX DENSITY

[75] Inventor: Yuuji Omata, Ibaraki, Japan

[73] Assignee: Matsushita Electric Industrial Co., Ltd., Osaka, Japan

[21] Appl. No.: 412,221

[22] Filed: Sep. 25, 1989

[30] Foreign Application Priority Data

Sep. 28, 1988 [JP] Japan .................. 63-243016

[51] Int. Cl.⁵ .............................................. C25D 3/56
[52] U.S. Cl. ................................. 204/38.4; 204/44.5
[58] Field of Search ...................... 204/44.5, 38.4

[56] References Cited

U.S. PATENT DOCUMENTS

| | | | |
|---|---|---|---|
| 3,297,418 | 1/1967 | Firestone et al. | 204/44.5 X |
| 3,533,922 | 10/1970 | Semienko et al. | 204/44.5 |
| 3,592,746 | 7/1971 | Hespenheide | 204/44.5 X |
| 3,597,335 | 8/1971 | Humpage et al. | 204/44.5 X |
| 4,014,759 | 3/1977 | McMullen et al. | 204/44.5 |
| 4,046,647 | 9/1977 | Harbulak | 204/44.5 |
| 4,053,373 | 10/1977 | McMullen et al. | 204/44.5 |
| 4,214,954 | 7/1980 | Kuo | 204/44.5 X |
| 4,661,216 | 4/1987 | Anderson et al. | 204/44.5 |

FOREIGN PATENT DOCUMENTS 1026781 4/1966 United Kingdom .

OTHER PUBLICATIONS

R. Sivakumar et al., Metal Finishing, pp. 66 and 74, Apr. 1969.
Abner Brenner, Electrodeposition of Alloys, vol. II, pp. 242–246, (1963).

Primary Examiner—G. L. Kaplan
Attorney, Agent, or Firm—Stevens, Davis, Miller & Mosher

[57] ABSTRACT

A ternary FeCoNi alloy film exhibiting a high magnetic flux density is produced by performing electrodeposition at a cathodic electrode using an electrolytic bath for electrodeposition fed with Fe, Co and Ni ions from sulfates, hydrochlorides or mixtures thereof containing respective divalent ions of Fe, Co and Ni, said bath containing a composition having ratios of divalent ion concentrations in the bath in the ranges:

$$0.05 \leq [Co^{2+}]/[Ni^{2+}] \leq 0.6 \quad \text{and}$$

$$0.05 \leq [Fe^{2+}]/[Ni^{2+}] \leq 2.0,$$

at an electrodepositing current density J in the range:

$$1 < J < 60 \; [mA/cm^2].$$

1 Claim, 2 Drawing Sheets

PROCESS FOR PRODUCING A THIN ALLOY FILM HAVING HIGH SATURATION MAGNETIC FLUX DENSITY

BACKGROUND OF THE INVENTION

1. Field of the Invention

The present invention relates to a process for producing a thin soft-magnetic alloy film having a high saturation magnetic flux density for use in high density magnetic recording and reproducing heads.

2. Description of the Related Art

Magnetic head materials effective as recording mediums having a high coercive force (Hc) as required for high density magnetic recording has to exhibit a high saturation magnetic density (Bs). As conventional soft-magnetic materials for thin film magnetic heads having a high Bs value, those which can be produced by an electrodeposition technique capable of patterning at a high accuracy through a low temperature process are limited to a binary Ni-Fe alloy (Permalloy) having a Bs value as Bs≃9,000 Gauss. In order to more sufficiently improve the magnetic recording and reproducing efficiency of the magnetic heads, however, it is desired that a thin film having a higher Bs value and excellent soft-magnetic properties can be produced by such an electrodeposition technique as having the same advantages as that for production of Permalloy.

Though thin ternary Fe-Co-Ni alloy films exhibit an extremely high Bs value when Bs=10,000 to 21,000 Guass and have excellent soft-magnetic properties, each of the components of the electrodeposited alloys has its own order at which it is preferentially deposited in a deposition sequence of the components and therefore, deposition of a plurality of components (as alloy deposition) is frequently difficult, or, if it is possible, control of the composition has many limitations. Specifically, no technique for electrodepositing thin films of a ternary alloy such as a Fe-Co-Ni system has been known heretofore.

Primarily, in electrodeposition of respective components from a solution containing ions such as Fe, Ni and Co, potentially noblest ions are expected to be preferentially deposited. As can be observed in electrodeposition of the known binary Fe-Ni alloy, a complex reaction such as discharge of H+ ion is associated on a cathodic electrode during the electrodeposition so that there is a problem of an increase of pH value in the vicinity of the cathodic electrode. That is, since each ion is discharged and electrodeposited through a layer of Fe hydroxides stable at a high pH value in the vicinity of the cathodic electrode, it is considered possible for component ions to be co-deposited during the electrodeposition (anormal co-deposition). For this reason, actually a variety of alloy compositions may be electrodeposited depending upon a ratio in concentration of ions in the electrodepositing bath.

The ratio of elements in electrodeposited alloy films may depend naturally upon various electrodeposition conditions such as a pH value throughout the electrodepositing bath, a current density at a cathode and the like, interalia, greately upon a ratio of respective ion concentrations (the absolute ion concentrations of respective components are not critical).

If a ratio of divalent Fe ion ($Fe^{2+}$) to other ions is too high, the influence of the Fe ion on the Fe hydroxide layer at the cathode at the time of Fe ion discharge offers primarily problems as described above, such as surface roughness due to the incorporation of oxidized Fe in the electrodeposited films, occurrence of adverse effect on the stable discharge of other ions ($Co^{2+}$, $Ni^{2+}$) resulting in instability of film composition and incapability of electrodeposition of the ternary alloy.

SUMMARY OF THE INVENTION

It is an object of the present invention to provide a process for producing a film of a ternary Fe-Co-Ni alloy suitable for high density magnetic recording and reproducing heads.

According to the present invention, the process for producing the alloy films exhibiting a high magnetic flux density is characterized in that a ternary alloy comprising Fe, Co and Ni is electrodeposited using an electrodepositing bath fed with Fe, Co and Ni ions from sulfates, hydrochlorides or mixtures thereof, said bath containing a composition having ratios in concentration of ions in the bath as follows:

$$0.05 \leq [Co^{2+}]/[Ni^{2+}] \leq 0.6 \text{ and}$$

$$0.05 \leq [Fe^{2+}]/[Ni^{2+}] \leq 2.0$$

at an electrodepositing current density J [mA/cm$^2$] in the range of:

$$1 < J < 60.$$

DETAILED DESCRIPTION OF PREFERRED EMBODIMENTS

Figure 1:
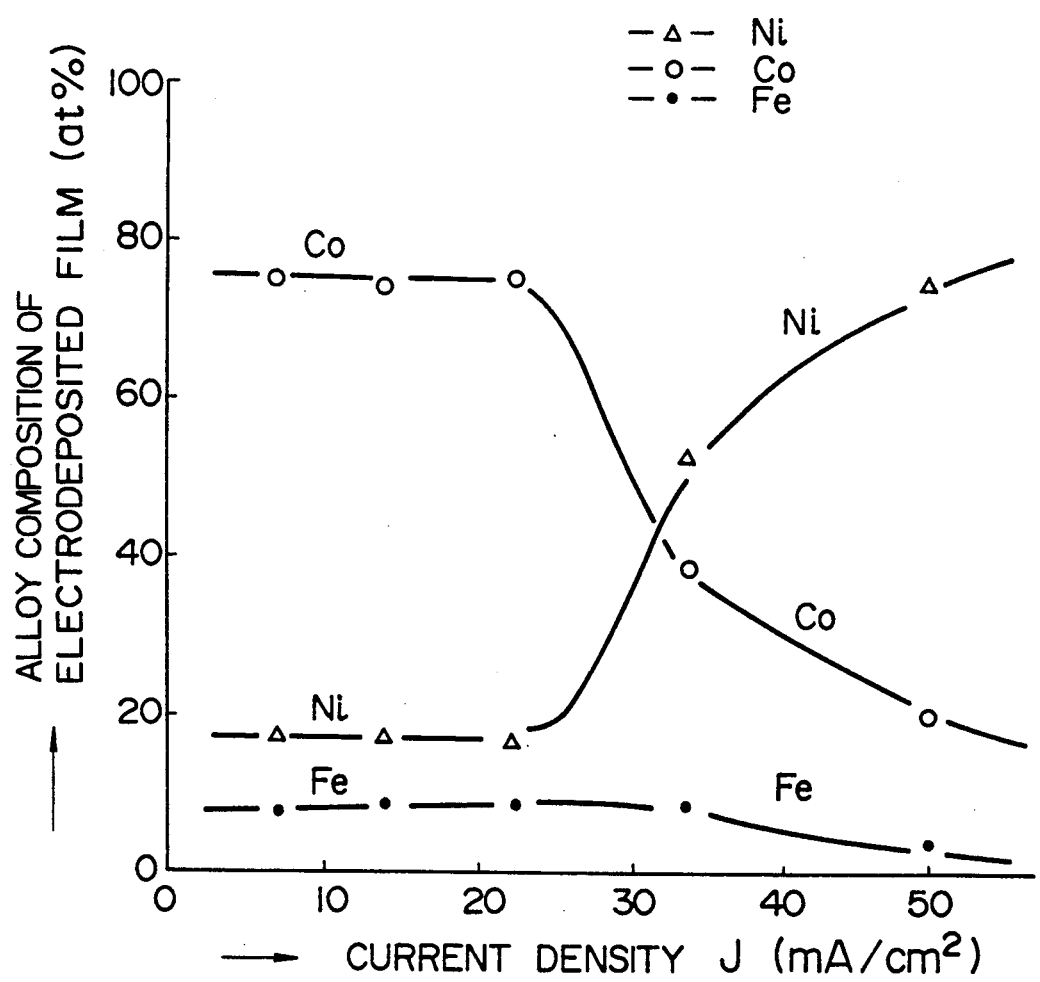
FIG. 1 is a graph showing a plot of variation of the elemental component composition [in at. %] for each of Fe, Co and Ni in the film as a function of the electrodeposition current density, i.e., J value, when the electrodeposition current density is varied in the range of 1<J<60 [mA/cm$^2$] in the bath composition No. 6 shown in Table 1 in Examples according to the present invention.

In the ranges of $0.05 \leq [Co^{2+}]/[Ni^{2+}]$ and $0.05 \leq [Fe^{2+}]/[Ni^{2+}]$, each of Fe, Ni and Co ions in the bath can be steadily supplied to a cathode electrode and in the ranges of $[Co^{2+}]/[Ni^{2+}] \leq 0.6$ and $[Fe^{2+}]/[Ni^{2+}] \leq 2.0$, stable electrodeposition films of the FeCoNi ternary alloy can be obtained. Moreover, in the electrodeposition with the bath containing a given composition, continuous variation of film composition is possible and films having superior surface property can be obtained in the rage of current density of $1 \leq J \leq 60$ [mA/cm$^2$].

Furthermore, soft-magnetic properties can be effectively improved by performing the electrodeposition with uniaxial magnetic anisotropy being induced in the magnetic film in a magnetic field set in the vicinity of the cathode in the electrodepositing bath. With regard to the bath pH, the electrodeposited films of the ternary alloy can be produced in a relatively wide range of $1.5 \leq pH \leq 5.5$. At an electrodeposition temperature in the range of 15° to 60° C., soft-magnetic films of a FeCoNi ternary alloy exhibiting a high saturation magnetic flux density can be obtained under suitable electrodeposition conditions. Cathode electrode materials may be vacuum deposition films such as the same FeCoNi film as the electrodeposited film or FeNi (Permalloy) film without any significant difference being caused by using either film. Moreover, addition of saccharin sodium and sodium lauryl sulfate in an amount of up to 3 g/l and 1 g/l, respectively, or boric acid in an amount of 1 mol/l to the electrodeposition bath can lead to removal of stress from the electrodeposited film of the ternary alloy during the electrodeposition, improvement of the surface properties of the film and stabilization of the pH value of bath.

EXAMPLE

Table 1 summarizes the conditions of the electrodeposition of the ternary FeNiCo alloy employed in the Examples of the present invention such as ratios in concentration of ions in the electrodeposition bath, pH, temperature, electrode materials, additives and the like, and film compositions.

In all the cases of the electrodeposition of the ternary alloy, the high saturation magnetic flux density of Bs > 10,000 Gauss was confirmed.

On the other hand, when the electrodeposition current density was varied using the same bath compositions, variations in composition of the ternary alloy, coercive force (Hc), and saturation magnetic flux density Bs are summarized in Table 2. (The results shown in Table 2 were obtained with the same bath compositions and electrodeposition conditions as those of No. 6 in Table 1, and the results shown in Table 3 were obtained with those of No. 15 in Table 1.) Examination of the ternary alloying with each bath shown in Table 1 where each of Fe, Co and Ni ions was supplied as sulfate and hydrochlorides indicated that when $$[Fe^{2+}]/[Ni^{2+}] \leq 2.0 \text{ and}$$

$$[Co^{2+}]/[Ni^{2+}] \leq 0.6$$

on the basis of the ion concentration $[Ni^{2+}]$ which was the highest, stable ternary alloy films were electrodeposited. (In the examination of the ratios of ion concentrations in the bath shown in Table 1, the current density J during the electrodeposition was held at a constant value of J=10 mA/cm². Other electrodeposition conditions are shown in the table.)

It was also found that the continuous variation of film composition could be effected and the films having excellent surface properties could be obtained in the range of a current density of:

$$1 < J < 60 \text{ [mA/cm}^2\text{]}$$

with the bath No. 6 in Table 1, as can be seen from Table 2. FIG. 1 shows the dependency of the proportion of each elemental component in the films on the electrodeposition current density as indicated in Table 2.

Figure 2:
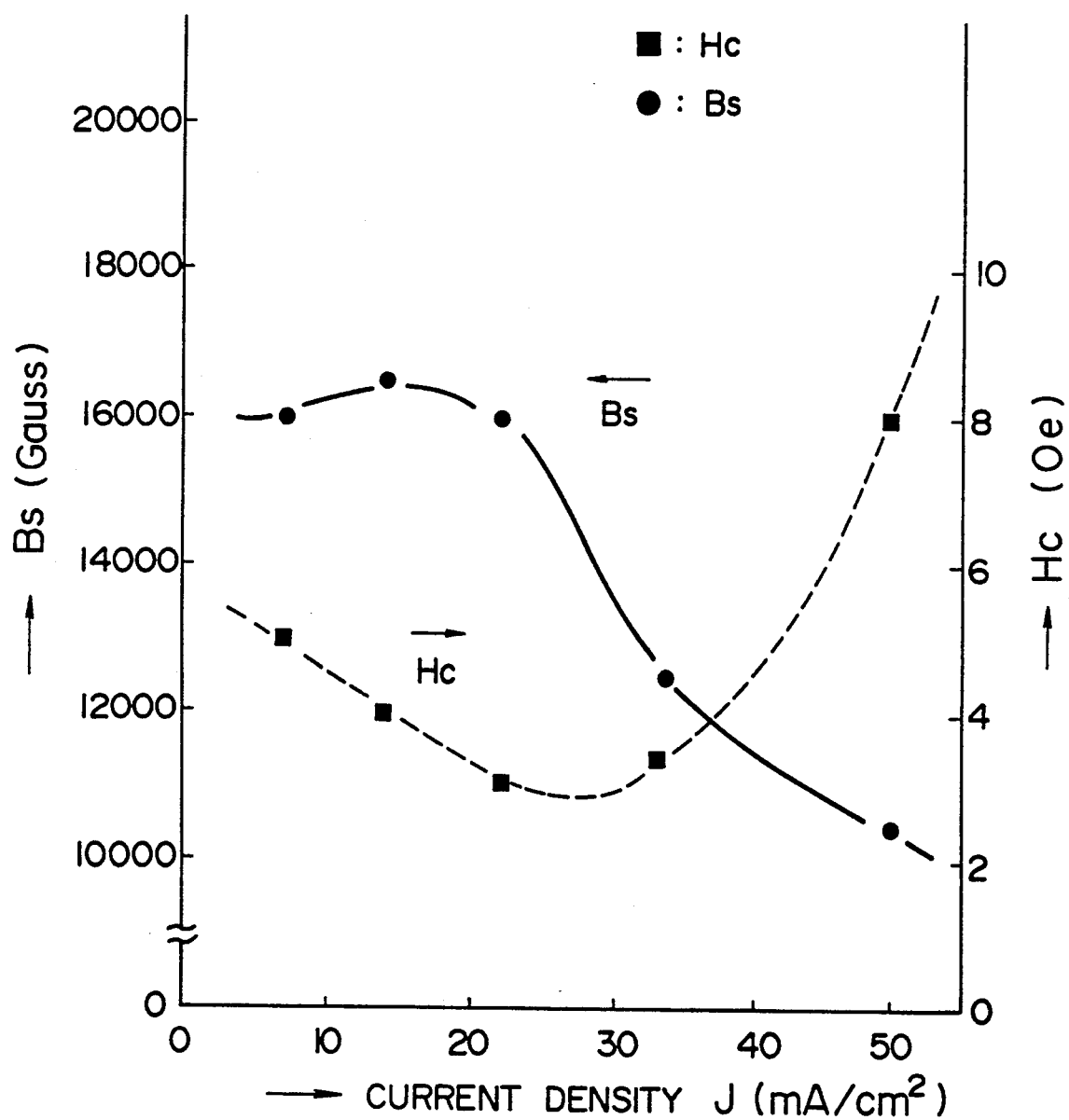
FIG. 2 is a graph showing plots of magnetic properties [coercive force Hc (Oe) and saturation magnetic flux density (Bs value)] of films produced with varying J values obtained from FIG. 1.

FIG. 2 shows also the values of coercive force Hc and saturation magnetic flux density for the electrodeposited ternary alloy films produced at each current density. In any case, the high saturation magnetic flux density was confirmed. It could be noted from Table 1 that the electrodeposited ternary alloy films could be produced at a relatively wide range of the bath pH value:

$$1.5 \leq pH \leq 5.5$$

In order to make steady supply of ions to the cathodic electrode in the bath, the ratios of respective ions should not be too low to expect the electrodeposition of the ternary alloy having a constant composition. As previously described, suitable results were obtained under the conditions:

$$0.05 \leq [Co^{2+}]/[Ni^{2+}] \text{ and}$$

$$0.05 \leq [Fe^{2+}]/[Ni^{2+}]$$

on the basis of ion concentration $[Ni^{2+}]$ as shown in Table 1.

It has been confirmed from the results shown in Table 1 that saccharin sodium, sodium lauryl sulfate and boric acid which have been used in the electrodeposition process are effective to achieve removal of stress, improvement of the surface properties of the films and stabilization of the pH value of bath in the aforementioned electrodeposition of the ternary alloy (they were added in an amount of 3 g/l, 1 g/l and 1 mol/l, respectively, as indicated in Table 1).

Moreover, although the attached films such as the same FeCoNi film as the electrodeposited film or FeNi (Permalloy) film were both employed as cathodic electrode materials, there was not caused any significant difference as shown in Table 1. Both Tables 1 and 2 summarize the results of the examination on those performed in the range of electrodeposition temperature of 15° to 60° C. at which the soft-magnetic films of FeCoNi ternary alloy exhibiting a high saturation magnetic flux density could be found to be produced under suitable electrodeposition conditions. In order to improve soft-magnetic properties, the process where the electrodeposition is performed in a magnetic field set in the vicinity of the cathode to induce uniaxial magnetic anisotropy in the magnetic film is effective.

TABLE 1

| Bath No. | $[Co^{2+}]/[Ni^{2+}]$ | $[Fe^{2+}]/[Ni^{2+}]$ | pH | Temperature | Cathode electrode material | Additives | Source salt for each ion | Film composition (at. %) Fe | Co | Ni | Remarks |
|---|---|---|---|---|---|---|---|---|---|---|---|
| 1 | 0.05 | 0.1 | 2.5 | 50° C. | Permalloy | ·saccharin sodium 3 g/l ·sodium lauryl sulfate 1 g/l ·H₃BO₃ 1 mol/l | sulfate and hydrochloride | 46 | 18 | 36 | |
| 2 | 0.1 | 0.1 | 2.0 | 40° C. | Permalloy | ·saccharin sodium 3 g/l ·sodium lauryl sulfate 1 g/l ·H₃BO₃ 1 mol/l | sulfate and hydrochloride | 18.9 | 9.9 | 71.2 | |
| 3 | 0.25 | 0.03 | 2.5 | 50° C. | Permalloy | ·saccharin sodium 3 g/l ·sodium lauryl | sulfate and hydro- | | | | not ternary-alloying |

TABLE 1-continued

| Bath No. | [Co²⁺]/[Ni²⁺] | [Fe²⁺]/[Ni²⁺] | pH | Temperature | Cathode electrode material | Additives | Source salt for each ion | Film composition (at. %) Fe | Co | Ni | Remarks |
|---|---|---|---|---|---|---|---|---|---|---|---|
| 4 | 0.25 | 0.05 | 2.5 | 50° C. | Permalloy | ·saccharin sodium 3 g/l ·sodium lauryl sulfate 1 g/l ·H₃BO₃ 1 mol/l | chloride sulfate and hydro-chloride | 4.3 | 77.7 | 18 | |
| 5 | 0.25 | 0.1 | 1.5 | 50° C. | FeNiCo film | ·saccharin sodium 3 g/l ·sodium lauryl sulfate 1 g/l ·H₃BO₃ 1 mol/l | sulfate and hydro-chloride | 6.0 | 75.0 | 19 | |
| 6 | 0.25 | 0.1 | 5.5 | 50° C. | FeNiCo film | ·saccharin sodium 3 g/l ·sodium lauryl sulfate 1 g/l ·H₃BO₃ 1 mol/l | sulfate and hydro-chloride | 9.0 | 73.8 | 17.2 | |
| 7 | 0.25 | 0.1 | 3.5 | 15° C. | FeNiCo film | ·saccharin sodium 3 g/l ·sodium lauryl sulfate 1 g/l ·H₃BO₃ 1 mol/l | sulfate and hydro-chloride | 10.2 | 69.8 | 20 | |
| 8 | 0.25 | 0.5 | 2.5 | 60° C. | FeNiCo film | ·saccharin sodium 3 g/l ·sodium lauryl sulfate 1 g/l ·H₃BO₃ 1 mol/l | sulfate and hydro-chloride | 18.6 | 65.2 | 16.2 | |
| 9 | 0.30 | 1.5 | 2.5 | 50° C. | FeNiCo film | ·saccharin sodium 3 g/l ·sodium lauryl sulfate 1 g/l ·H₃BO₃ 1 mol/l | sulfate and hydro-chloride | 20.3 | 70.3 | 9.5 | |
| 10 | 0.35 | 2.0 | 2.5 | 50° C. | FeNiCo film | ·saccharin sodium 3 g/l ·sodium lauryl sulfate 1 g/l ·H₃BO₃ 1 mol/l | sulfate and hydro-chloride | 22.2 | 73.3 | 4.5 | |
| 11 | 0.40 | 0.1 | 2.5 | 50° C. | FeNiCo film | ·saccharin sodium 3 g/l ·sodium lauryl sulfate 1 g/l ·H₃BO₃ 1 mol/l | sulfate alone | | | | not ternary alloying |
| 12 | 0.40 | 0.1 | 2.5 | 50° C. | FeNiCo film | ·saccharin sodium 3 g/l ·sodium lauryl sulfate 1 g/l ·H₃BO₃ 1 mol/l | hydro-chloride alone | 8.0 | 75.5 | 16.5 | |
| 13 | 0.60 | 0.5 | 2.5 | 50° C. | FeNiCo film | ·saccharin sodium 3 g/l ·sodium lauryl sulfate 1 g/l ·H₃BO₃ 1 mol/l | sulfate and hydrochlorate | 11.9 | 84.7 | 3.4 | |
| 14 | 0.70 | 0.1 | 2.5 | 50° C. | FeNiCo film | ·saccharin sodium 3 g/l ·sodium lauryl sulfate 1 g/l ·H₃BO₃ 1 mol/l | sulfate and hydrochlorate | | | | not ternary alloying |
| 15 | 0.055 | 0.3 | 2.5 | 50° C. | FeNiCo film | ·saccharin sodium 3 g/l ·sodium lauryl sulfate 1 g/l ·H₃BO₃ 1 mol/l | sulfate and hydrochlorate | 40 | 20 | 40 | |

TABLE 2

(Bath composition and electrodeposition conditions are based on those of No. 6 shown in Table 1)

| Current density | | Fe [at. %] | Co [at. %] | Ni [at. %] | Hc [Oe] | Bs [Gauss] |
|---|---|---|---|---|---|---|
| J = 7.2 | [mA/cm²] | 7.8 | 74.8 | 17.4 | 5.0 | 16,000 |
| J = 10.4 | " | 9.0 | 73.8 | 17.2 | 4.0 | 16,500 |
| J = 22.4 | " | 8.5 | 75.3 | 16.2 | 3.0 | 16,000 |
| J = 33.6 | " | 8.5 | 38.6 | 52.9 | 3.5 | 12,500 |
| J = 50.0 | " | 4.0 | 19.9 | 76.1 | 8.0 | 10,500 |

TABLE 3

(Bath composition and electrodeposition conditions are based on those of No. 15 shown in Table 1)

| Current density | | Fe [at. %] | Co [at. %] | Ni [at. %] | Hc [Oe] | Bs [Gauss] |
|---|---|---|---|---|---|---|
| J = 6 | [mA/cm²] | 14 | 13 | 73 | 1 | 11,800 |
| J = 10 | " | 40 | 20 | 40 | 1 | 17,500 |
| J = 12 | " | 42 | 20 | 38 | 1 | 18,500 |
| J = 20 | " | 42 | 19 | 39 | 2 | 18,000 |
| J = 30 | " | 41 | 19 | 40 | 3 | 18,000 |

The present invention allows the electrodeposition of the ternary Fe-Co-Ni alloy having an extremely high Bs value and the production of soft-magnetic substance for use in thin film magnetic head having a sufficient magnetic recording and reproducing efficiency.

What is claimed is:

1. A process for producing an FeCoNi alloy film exhibiting a high magnetic flux density, which comprises using a ternary FeCoNi alloy film or FeNi (Permalloy) film formed by evaporation as a material of a cathode, using an electrodepositing bath containing divalent ions of each of Fe, Co and Ni in a form of either or both of a sulfate and chloride, said bath containing a composition having ratios of the concentration of the divalent ions within the ranges of $0.05 \leq [Co^{2+}]/[Ni^{2+}] \leq 0.06$ and $0.05 \leq [Fe^{2+}]/[Ni^{2+}] \leq 2.0$, and electrodepositing the FeNiCo alloy film on said cathode at an electrodepositing current density J at the cathode of $1 < J < 60$ (mA/cm$^2$)

a bath of pH of $1.5 < pH < 5.5$ and a bath temperature T of $15 \leq T \leq 60°$ C.

* * * * *